(12) United States Patent
Tsukude (10) Patent No.: US 8,061,895 B2
(45) Date of Patent: Nov. 22, 2011

(54) SEMICONDUCTOR DEVICE

(75) Inventor: Masaki Tsukude, Tokyo (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 434 days.

(21) Appl. No.: 12/362,495

(22) Filed: Jan. 30, 2009

(65) Prior Publication Data

US 2009/0196326 A1    Aug. 6, 2009

(30) Foreign Application Priority Data

Feb. 4, 2008   (JP) ................. 2008-023750

(51) Int. Cl.
 *G01K 7/00* (2006.01)
 *G11C 7/04* (2006.01)
 *H03K 17/14* (2006.01)
(52) U.S. Cl. ........ 374/176; 374/163; 374/141; 365/212; 365/189.09; 365/189.11
(58) Field of Classification Search ................. 374/141, 374/163, 170, 171, 172, 173, 176, 178, E7.001; 702/130, 132, 99; 365/211, 212, 189.09, 365/189.11; 327/83, 513, 539
See application file for complete search history.

(56) References Cited

U.S. PATENT DOCUMENTS

| 5,375,093 | A | 12/1994 | Hirano | |
|---|---|---|---|---|
| 5,875,142 | A * | 2/1999 | Chevallier | 365/212 |
| 6,717,878 | B2 * | 4/2004 | Hagura et al. | 365/211 |
| 7,107,178 | B2 * | 9/2006 | Won et al. | 702/130 |
| 7,383,149 | B1 * | 6/2008 | Walker | 702/130 |
| 7,492,657 | B2 * | 2/2009 | Sako | 365/222 |
| 7,528,644 | B2 * | 5/2009 | Choi et al. | 327/512 |
| 7,603,249 | B1 * | 10/2009 | Walker | 702/130 |
| 7,710,705 | B2 * | 5/2010 | Balakrishnan et al. | 361/103 |
| 2002/0012277 | A1 * | 1/2002 | Einaga | 365/189.11 |

FOREIGN PATENT DOCUMENTS

| JP | 1993-266658 A | 10/1993 |
|---|---|---|
| JP | 2003258112 A * | 9/2003 |

* cited by examiner

*Primary Examiner* — R. A. Smith
(74) *Attorney, Agent, or Firm* — Miles & Stockbridge P.C.

(57) ABSTRACT

There is provided a semiconductor device which can maintain a high tuning accuracy while suppressing a cost increase and suppress an increase in the time required for tuning. There are included, in addition to variable resistors configuring a level shift circuit, an additional resistor coupled between the output node of a VBGR voltage of a BGR circuit and one of the variable resistors and an additional resistor coupled between the other of the variable resistors and a reference voltage. N-channel MOS transistors are coupled in parallel with the additional resistors, respectively.

9 Claims, 9 Drawing Sheets

SEMICONDUCTOR DEVICE

CROSS-REFERENCE TO RELATED APPLICATIONS

The disclosure of Japanese Patent Application No. 2008-23750 filed on Feb. 4, 2008 including the specification, drawings and abstract is incorporated herein by reference in its entirety.

BACKGROUND OF THE INVENTION

The present invention relates to a semiconductor device, and in particular, relates to a semiconductor device having a temperature detection circuit which, when the temperature of a semiconductor chip exceeds a predetermined temperature, informs the outside accordingly.

In recent years, in a memory chip for SiP (system in package) incorporating a microprocessor and sensors as well as memory in one package, the function of outputting the information when the chip inside temperature exceeds a predetermined temperature to a control apparatus (microprocessor or the like) for controlling the memory has been required.

As an example of a temperature detection circuit, FIGS. 1 to 4 in Japanese Unexamined Patent Publication No. Hei 5(1993)-266658 illustrate that the order in which respective output signals are outputted from a delay circuit having large temperature dependence in delay time and a delay circuit having small temperature dependence is used as a temperature detection signal.

SUMMARY OF THE INVENTION

An object of the invention described in Japanese Unexamined Patent Publication No. Hei 5(1993)-266658 is to obtain a temperature detection circuit of small manufacturing variations. While the fluctuation of a detection temperature due to manufacturing variations is the biggest problem to be solved for the temperature detection circuit incorporated in the memory chip, there is no circuit that completely does not have manufacturing variations, so that the detection temperature is set slightly higher in consideration of the fluctuation, or correction processing called tuning is performed during a wafer test stage.

In order to perform tuning, a tuning circuit is necessary. However, to extend the tuning range or enhance the tuning accuracy, the tuning circuit becomes larger in size or the control thereof becomes complicated, which disadvantageously requires time and cost for tuning.

The present invention has been made to solve the above problem, and it is an object of the invention to provide a semiconductor device, having a temperature detection circuit, which can maintain a high tuning accuracy while suppressing a cost increase and suppress an increase in the time required for tuning.

According to one aspect of the invention, there are included, in addition to variable resistors configuring a tuning circuit, an additional resistor coupled between the output node of a VBGR voltage of a BGR circuit and a variable resistor and an additional resistor coupled between a variable resistor and a reference voltage, and N-channel MOS transistors are coupled in parallel with the additional resistors respectively.

By adding a raising circuit to the tuning circuit, it is possible to raise the voltage of a third signal by a certain level and greatly decrease a detection temperature in a test mode without changing the circuit size of the tuning circuit. Even in the case where the detection temperature changes greatly between the test mode and the normal mode, without increasing the size of the tuning circuit it is possible to prevent a cost increase, maintain a high tuning accuracy, and suppress an increase in the time required for tuning.

DESCRIPTION OF THE PREFERRED EMBODIMENTS

<About Tuning>

Prior to description of the invention, the configuration and operation of a typical temperature detection circuit will be described with reference to FIGS. 1 to 7.

Figure 1:
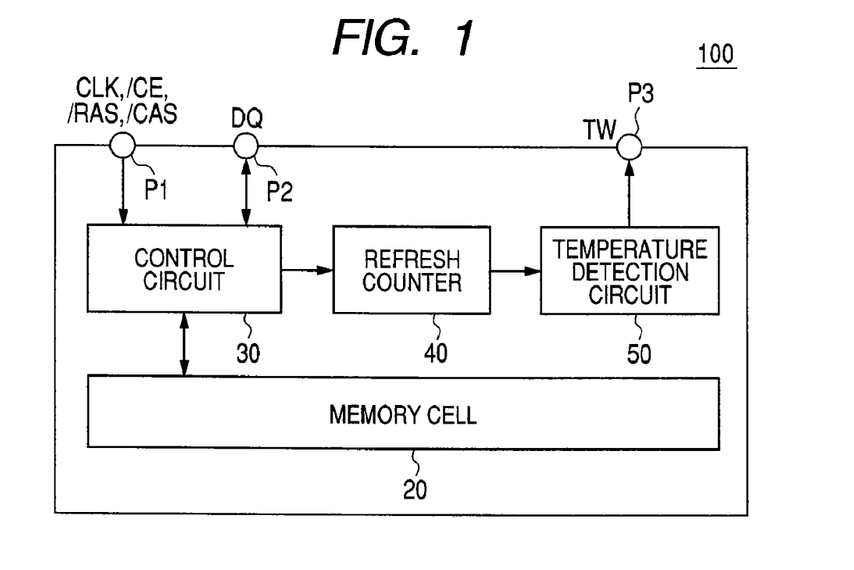
FIG. 1 is a block diagram showing the configuration of a memory chip containing a temperature detection circuit.

FIG. 1 is a block diagram showing the configuration of a memory chip 100 containing a temperature detection circuit. The memory chip 100 shown in FIG. 1 includes a memory cell 20, a control circuit 30 for the memory cell 20, a refresh counter 40 for managing the timing of the refresh operation of the memory cell 20, and a temperature detection circuit 50. A clock signal and a control signal are inputted to the control circuit 30 through an external pin P1, and data is inputted and outputted to and from the control circuit 30 through an external pin P2.

The temperature detection circuit 50 sets a detection temperature based on the upper limit of the guaranteed temperature of the memory chip 100. When the chip inside reaches the guaranteed temperature, the temperature detection circuit 50 outputs a temperature warning signal TW as a predetermined voltage (e.g., "H") to the outside through an external pin P3.

A memory controller provided on the outside of the memory chip 100 monitors the temperature warning signal TW. If the temperature warning signal TW is "L", the memory controller treats the memory chip 100 as being in a normal operating state. If the temperature warning signal TW is "H", the memory controller determines that the temperature of the memory chip 100 has increased and the data retention characteristic of the memory has deteriorated, and performs control so as to shorten the refresh interval for data retention, for example, performs control so as to retain memory data by changing the setting of the refresh counter 40.

Figure 2:
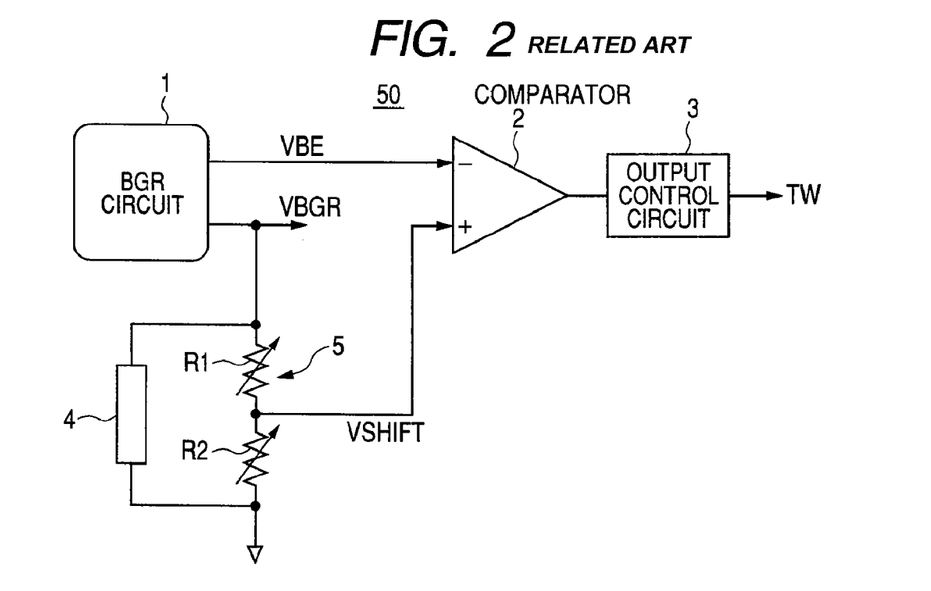
FIG. 2 is a block diagram showing the configuration of the temperature detection circuit.

FIG. 2 is a block diagram showing an example of the configuration of the temperature detection circuit 50. The temperature detection circuit 50 shown in FIG. 2 includes a BGR (band-gap-reference) circuit 1 which generates a band-gap reference voltage (VBGR voltage: a second signal) having small temperature dependence and a base-to-emitter voltage (VBE voltage) having large temperature dependence, a level shift circuit 5 which shifts the level of the VBGR voltage and generates a shift voltage (VSHIFT voltage), a comparator (comparison circuit) 2 which compares the VBE voltage (a first signal) with the VSHIFT voltage (a third signal) and outputs a temperature determination result, and an output control circuit 3 which receives the temperature determination result outputted from the comparator 2, updates it at predetermined intervals, and outputs the temperature warning signal TW.

The level shift circuit 5 has dividing resistors comprised of variable resistors R1 and R2 coupled in series between the output node of the VBGR voltage of the BGR circuit 1 and a reference voltage (voltage of a common connection). The connection node of both resistors is the output node of the VSHIFT voltage, and the level of the VBGR voltage is shifted by resistance division.

By changing the resistance values of the variable resistors R1 and R2, it is possible to shift the level of the VSHIFT voltage in the range of plus or minus about 10%. The temperature detection circuit 50 is tuned by changing the resistance values of the variable resistors R1 and R2 to shift the level of the VSHIFT voltage; therefore, the level shift circuit 5 can also be called a tuning circuit.

Figure 3:
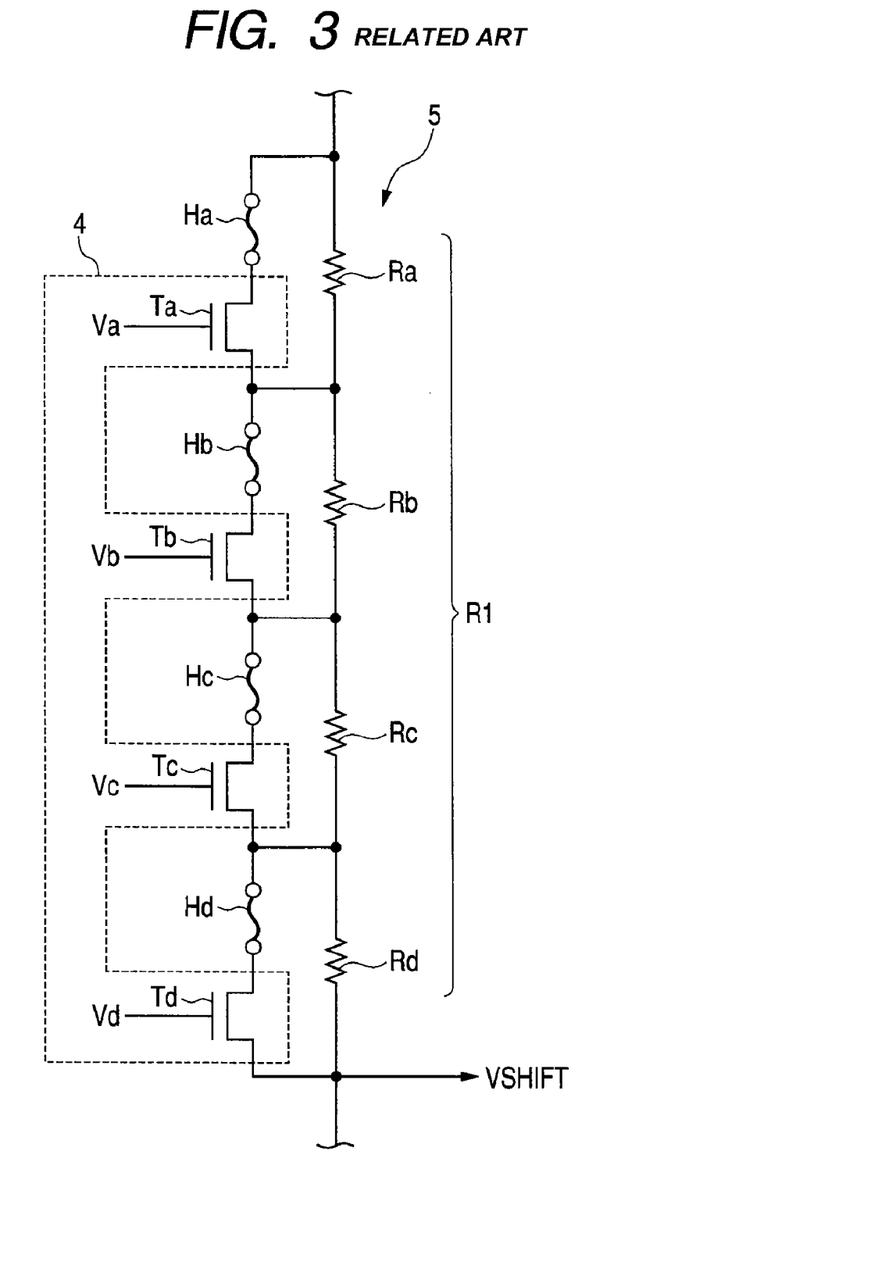
FIG. 3 is a diagram showing, as an equivalent circuit, the configuration of a level shift circuit and a simulation circuit.

FIG. 3 is a diagram showing, as an equivalent circuit, the configuration of the level shift circuit 5 and the configuration of a simulation circuit 4 used for checking the operation of the temperature detection circuit 50. FIG. 3 illustrates only the configuration of the variable resistor R1.

As shown in FIG. 3, the variable resistor R1 is comprised of a plurality of resistors Ra, Rb, Rc, and Rd coupled in series and fuses Ha, Hb, Hc, and Hd coupled in parallel with the resistors Ra, Rb, Rc, and Rd respectively.

Further, N-channel MOS transistors Ta, Tb, Tc, and Td are coupled in series with the fuses Ha, Hb, Hc, and Hd respectively in the simulation circuit 4.

If an arbitrary fuse is cut, a current flows through a resistor in parallel with the fuse, and the resistance value thereof becomes the resistance value of the variable resistor R1. The resistance value of the variable resistor R1 increases as the number of cut fuses increases. To simplify the description, FIG. 3 shows the configuration in which the variable resistor R1 can be varied only in the direction that increases the resistance value. However, needless to say, it is also possible to configure a variable resistor which can be varied in the direction that decreases the resistance value.

The cutting of the fuses Ha to Hd is performed by laser irradiation or by passing an overcurrent after check of the operation of the temperature detection circuit 50 during a wafer test stage. Since fuses cannot be restored once they are cut; in the operation check of the temperature detection circuit 50, the same state as where fuses are cut is produced in a simulated manner, using the simulation circuit 4.

That is, by turning off any one of the MOS transistors Ta, Tb, Tc, and Td coupled in series with the respective fuses, it is possible to obtain the same state as where the corresponding fuse is cut, so that a current flows through the resistor in parallel with the fuse.

In a test for a temperature detection operation of the temperature detection circuit 50, an arbitrary MOS transistor is turned off by arbitrarily controlling the MOS transistors Ta to Td in the simulation circuit 4 described with reference to FIG. 3, thereby changing the resistance value of the variable resistor. In this state, it is checked whether or not the temperature detection circuit 50 detects a predetermined temperature. After the temperature detection check, a fuse coupled to the turned-off MOS transistor is actually cut, thereby determining the resistance value of the variable resistor. This is called a tuning operation.

Although, in the level shift circuit 5, the variation width of the resistance values can decrease as the number of resistors configuring the variable resistors R1 and R2 is increased, the number of MOS transistors configuring the simulation circuit 4 also increases, which increases the size thereof and also the size of a circuit for on/off control of the MOS transistors.

Figure 4:
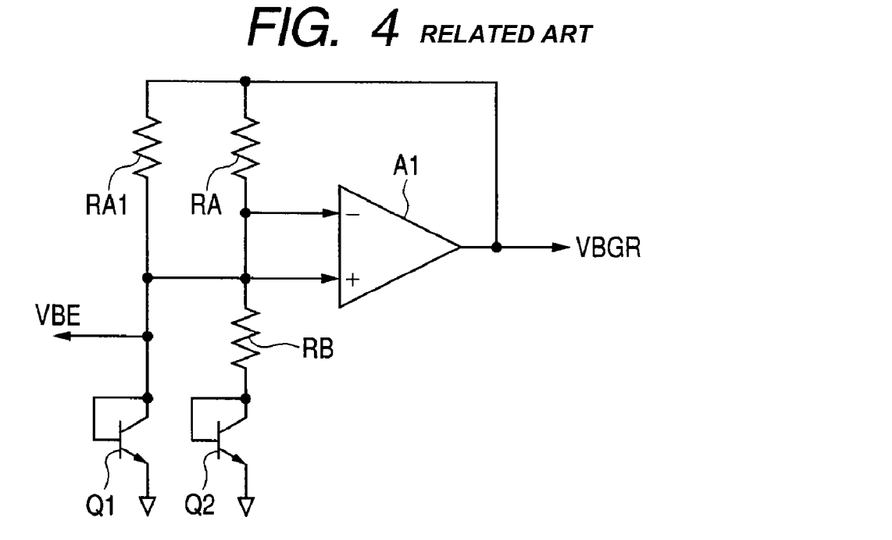
FIG. 4 is a diagram showing the configuration of a BGR circuit.

FIG. 4 shows the configuration of the BGR circuit 1. The BGR circuit 1 shown in FIG. 4 is a typical reference voltage generation circuit and generates a VBGR voltage by utilizing characteristics of bipolar transistors.

In the BGR circuit 1 shown in FIG. 4, a resistor RA1 and a diode-coupled NPN bipolar transistor Q1 are coupled in series between the output of a differential amplifier A1 and the reference voltage. Similarly, resistors RA and RB and a diode-coupled NPN bipolar transistor Q2 are coupled in series between the output of the differential amplifier A1 and the reference voltage. A potential at the connection node of the resistors RA and RB is supplied to the minus terminal of the differential amplifier A1, and a potential at the connection node of the resistor RA1 and the bipolar transistor Q1 is supplied to the plus terminal of the differential amplifier A1. The output of the differential amplifier A1 is the VBGR voltage, and the potential at the connection node of the resistor RA1 and the bipolar transistor Q1 is the VBE voltage.

As seen in FIG. 4, the VBE voltage exhibits a simple diode characteristic and is the forward voltage of a typical diode, having a negative temperature characteristic.

The VBGR voltage is expressed by the following equation (1):

$$VBGR = VBE + VT \cdot \ln(N) \cdot (1 + RA/RB) \quad (1)$$

where N is the number of bipolar transistors Q2, and RA and RB are the resistance values of the resistors RA and RB, respectively.

Further, the thermal voltage VT and the VBE voltage are expressed by the following equations (2) and (3) respectively:

$$VT = kT/q \qquad (2)$$

$$VBE = VT \cdot \ln(Ic/Is) \qquad (3)$$

where k=Boltzmann constant, q=elementary charge, T=absolute temperature, Is=saturation current, and Ic=collector current.

As seen from the equation (1), the VBGR voltage having a different temperature characteristic from that of the VBE voltage is generated by adjusting the values of the resistors RA and RB. The VBGR voltage has extremely smaller temperature dependence than the VBE voltage and exhibits approximately a constant level. However, the VBGR voltage is not limited to a constant level, and any voltage can be used for temperature determination as long as it has a different temperature characteristic from that of the VBE voltage.

The VBGR voltage can be shifted by the resistance values of the variable resistors R1 and R2. Accordingly, by setting the resistance values of the variable resistors R1 and R2 so that the VSHIFT voltage obtained by shifting the VBGR voltage intersects with the VBE voltage, e.g., at 92° C., it is possible to adjust a determination temperature.

Figure 5:
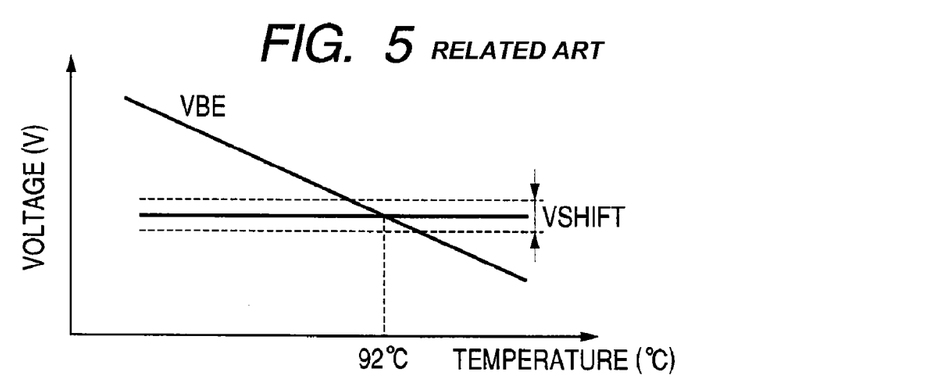
FIG. 5 is a graph showing a state of changing a detection temperature by shifting a VSHIFT voltage.

FIG. 5 is a graph showing a state of changing the point of intersection of the VSHIFT voltage and the VBE voltage, that is, a detection temperature by shifting the VSHIFT voltage, as an example in which the VSHIFT voltage is shifted so that the detection temperature is 92° C. In FIG. 5, the horizontal axis indicates the temperature (° C.), and the vertical axis indicates the voltage (V).

Further, the comparator 2 (FIG. 2) has a hysteresis characteristic which suppresses the variation of the temperature warning signal TW around at the determination level of the chip inside temperature. If the comparator 2 does not have a hysteresis characteristic, an unstable phenomenon occurs as follows. Assume that the detection temperature of the chip inside is about 92° C. When the temperature becomes slightly lower than 92° C., the temperature warning signal TW becomes "L". Further, immediately thereafter, when the temperature becomes 92° C., the temperature warning signal TW becomes "H", thus causing an unstable phenomenon. If the temperature warning signal TW varies, the operation of external circuits in response thereto becomes unstable, thus increasing power consumption.

On the other hand, if the comparator 2 has a hysteresis characteristic, the characteristic of the comparator 2 changes between a temperature increase to 92° C. and a temperature decrease to 92° C., which can prevent a sensitive response at a boundary temperature of 92° C.

Figure 6:
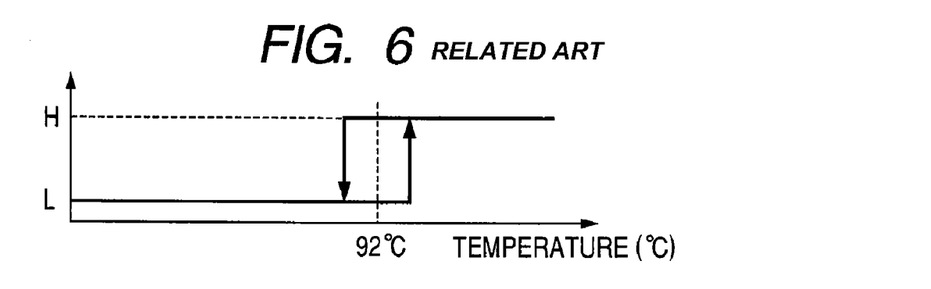
FIG. 6 is a graph schematically showing a hysteresis characteristic of a comparator.

FIG. 6 schematically shows the hysteresis characteristic of the comparator 2. In FIG. 6, the horizontal axis indicates the temperature (° C.), and the vertical axis indicates the level "L" and "H" of the temperature warning signal TW.

Figure 7:
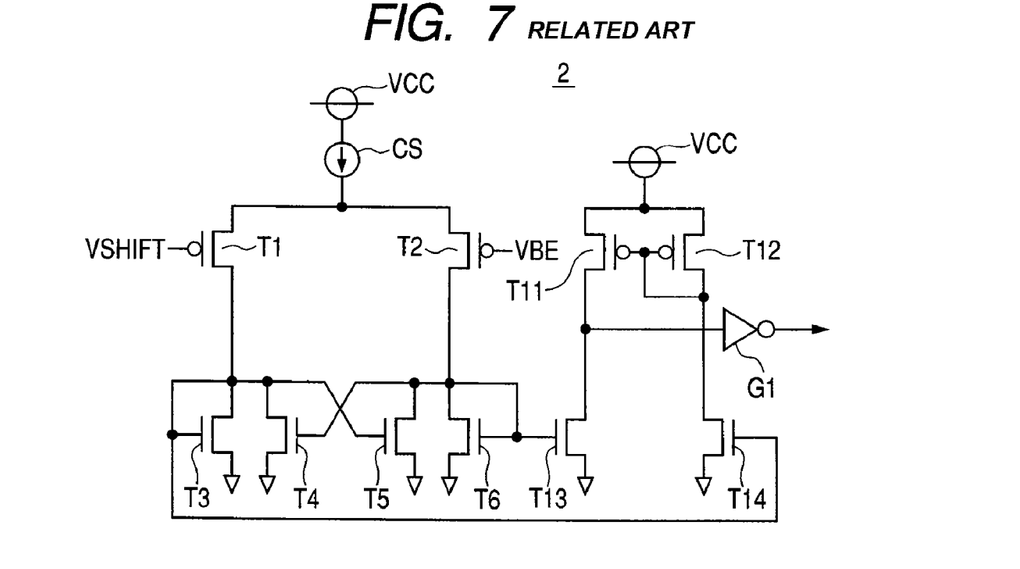
FIG. 7 is a diagram showing the configuration of the comparator.

FIG. 7 shows an example of the configuration of the comparator 2. As shown in FIG. 7, the comparator 2 includes a P-channel MOS transistor T1 and an N-channel MOS transistor T3 coupled in series and a P-channel MOS transistor T2 and an N-channel MOS transistor T6 coupled in series between a constant current source CS and the reference voltage.

Further, N-channel MOS transistors T4 and T5 are coupled between the respective drains of the MOS transistors T3 and T6 and the reference voltage. The gate of the MOS transistor T4 is coupled to the drains of the MOS transistors T5 and T6. The gate of the MOS transistor T5 is coupled to the drains of the MOS transistors T3 and T4.

The VSHIFT voltage and the VBE voltage are supplied to the gates of the MOS transistors T1 and T2, respectively.

Further, the comparator 2 includes a P-channel MOS transistor T11 and an N-channel MOS transistor T13 coupled in series and a P-channel MOS transistor T12 and an N-channel MOS transistor T14 coupled in series between a power source VCC and the reference voltage. Further, the gates of the MOS transistors T11 and T12 are coupled in common to the drain of the MOS transistor T12. The drain of the MOS transistor T11 is coupled to the input of an inverter G1. The output of an inverter G1 is the output of the comparator 2.

Further, the drain and gate of the MOS transistor T3 are coupled in common to the gate of the MOS transistor T14. The drain and gate of the MOS transistor T6 are coupled in common to the gate of the MOS transistor T13.

By having a hysteresis circuit comprised of the MOS transistors T4 and T5 whose gates are coupled to each other's drains, even if one of the VSHIFT voltage and the VBE voltage changes; by feedback to maintain the current output, the comparator 2 has the hysteresis characteristic.

First Embodiment

Next, the configuration and operation of a temperature detection circuit according to the first embodiment of the invention will be described with reference to FIGS. 8 to 12.

Figure 8:
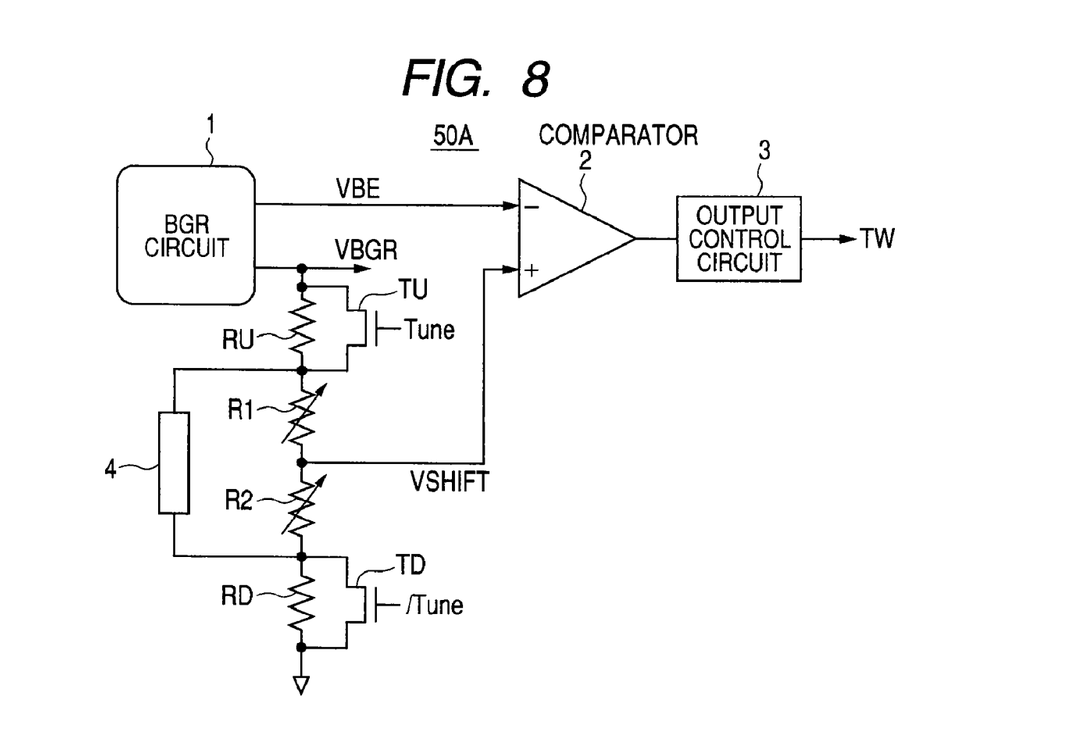
FIG. 8 is a block diagram showing the configuration of a temperature detection circuit according to a first embodiment of the invention.

FIG. 8 is a block diagram showing the configuration of a temperature detection circuit 50A according to the first embodiment. The same configurations as in the temperature detection circuit 50 described with reference to FIG. 2 are denoted by the same reference numerals, and their description will not be repeated.

Further, the temperature detection circuit 50A can be substituted for the temperature detection circuit 50 of the memory chip 100 shown in FIG. 1. The temperature detection circuit 50A shown in FIG. 8 has, in addition to the variable resistors R1 and R2 configuring the level shift circuit 5, an additional resistor RU (a first resistor) coupled between the output node of the VBGR voltage of the BGR circuit 1 and the variable resistor R1 and an additional resistor RD (a second resistor) coupled between the variable resistor R2 and the reference voltage. N-channel MOS transistors TU (a first transistor) and TD (a second transistor) are coupled in parallel with the additional resistors RU and RD, respectively.

Further, a tuning signal Tune which is "H" during tuning ("L" during non-tuning) and an inversion tuning signal /Tune which is "L" during tuning ("H" during non-tuning) are supplied to the gates of the MOS transistors TU and TD, respectively.

During tuning, the MOS transistor TU is in the ON state, and the MOS transistor TD is in the OFF state. Accordingly, in addition to the variable resistors R1 and R2, the additional resistor RD is added to the level shift circuit 5, so that the VSHIFT voltage is determined by resistance division by the variable resistors R1 and R2 and the additional resistor RD. As a result, the VSHIFT voltage is raised by a certain level during tuning (i.e., a test mode) than during non-tuning (i.e., a normal mode), so that it is possible to uniformly decrease the detection temperature.

The resistance value of the additional resistor RD is set to about five to ten times larger than that of one of the multiple resistors configuring the variable resistors R1 and R2. However, the resistance value of the additional resistor RD is not limited thereto, and can be set to any value that suppresses a change in the amount of current flowing into the level shift circuit when the MOS transistor TU is turned on from off.

Since the additional resistor RD raises the VSHIFT voltage by a certain level in the test mode, the additional resistor RD and the MOS transistor TD can be called a raising circuit for the VSHIFT voltage.

Further, since the additional resistors RD and RU have substantially the same resistance value and the additional resistor RU is provided to prevent a change in the amount of current flowing into the level shift circuit 5 between tuning and non-tuning caused by having the additional resistor RD, it can be said that the additional resistor RU and the MOS transistor TU also configure the raising circuit.

Figure 9:
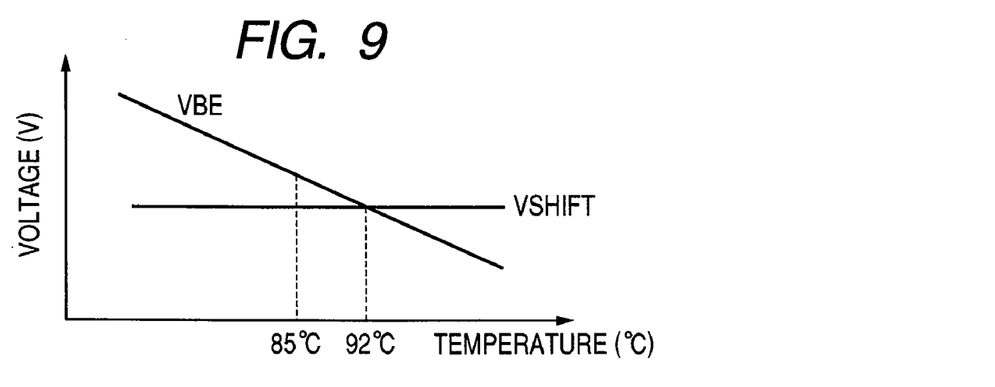
FIG. 9 is a graph showing a detection temperature in a normal mode.
Figure 10:
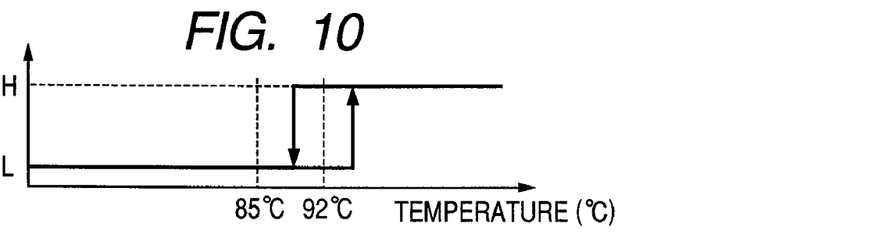
FIG. 10 is a graph schematically showing a hysteresis characteristic of the comparator in the normal mode.
Figure 11:
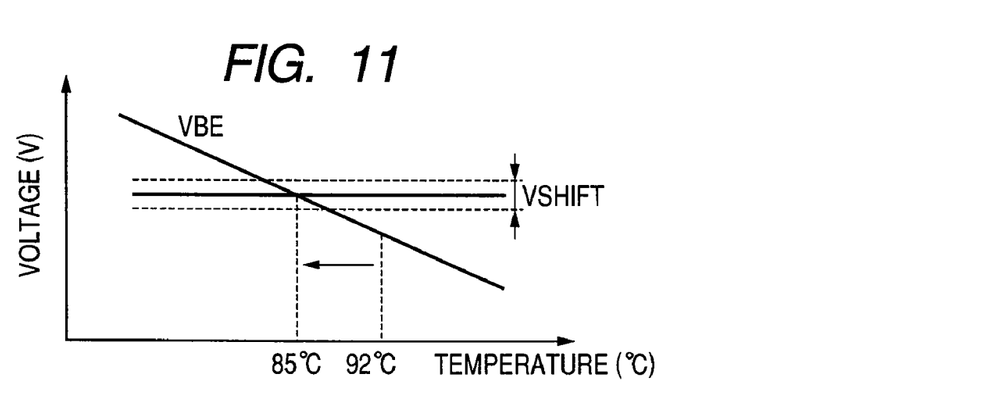
FIG. 11 is a graph showing a change of the detection temperature in a test mode.
Figure 12:
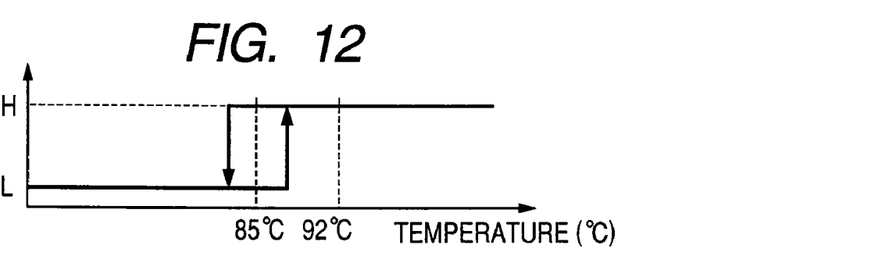
FIG. 12 is a graph schematically showing a hysteresis characteristic of the comparator in the test mode.

FIGS. 9 and 10 show the operation of the temperature detection circuit 50A in the normal mode, and FIGS. 11 and 12 show the operation of the temperature detection circuit 50A in the test mode.

FIG. 9 shows that the point of intersection of the VSHIFT voltage and the VBE voltage, that is, the detection temperature is 92° C. in the normal mode. In FIG. 9, the horizontal axis indicates the temperature (° C.), and the vertical axis indicates the voltage (V).

FIG. 10 schematically shows a hysteresis characteristic of the comparator 2 in the normal mode, and shows that the characteristic of the comparator 2 changes between temperature increase and temperature decrease to a detection temperature of 92° C. In FIG. 10, the horizontal axis indicates the temperature (° C.), and the vertical axis indicates the level "L" and "H" of the temperature warning signal TW.

FIG. 11 shows that the VSHIFT voltage is increased in the test mode so that the point of intersection of the VSHIFT voltage and the VBE voltage, that is, the detection temperature changes to 85° C. In FIG. 11, the horizontal axis indicates the temperature (° C.), and the vertical axis indicates the voltage (V).

FIG. 12 schematically shows a hysteresis characteristic of the comparator 2 in the test mode, and shows that the characteristic of the comparator 2 changes between temperature increase and temperature decrease to a detection temperature of 85° C. In FIG. 12, the horizontal axis indicates the temperature (° C.), and the vertical axis indicates the level "L" and "H" of the temperature warning signal TW.

As described with reference to FIG. 5, in the temperature detection circuit 50 (FIG. 2), the VSHIFT voltage is increased or decreased by adjusting the resistance values of the variable resistors R1 and R2, thus making it possible to adjust the detection temperature. To extend this adjustable range, it is necessary to extend the variation range of the resistance values of the variable resistors R1 and R2. In association therewith, it is necessary to increase the number of multiple resistors and fuses configuring the variable resistors and the number of MOS transistors configuring the simulation circuit 4 (FIG. 3) to perform fine adjustment, which increases the circuit size and complicates the control of the simulation circuit 4. Consequently, the adjustable range of the level shift circuit 5 is not set wide enough to completely adjust fluctuations of the detection temperature due to manufacturing variations of the temperature detection circuit 50.

However, in the temperature detection circuit 50A, by adding the additional resistor RD to the level shift circuit 5, it is possible to raise the VSHIFT voltage by a certain level in the test mode without changing the circuit size of the level shift circuit 5 and deal with the case where the detection temperature changes greatly between the test mode and the normal mode. Hereinafter, description will be made of the reason why the detection temperature changes greatly between the test mode and the normal mode.

In the first place, the detection temperature should be set to the upper limit of the guaranteed temperature of the memory chip, e.g., 85° C. However, in consideration of fluctuations of the detection temperature, a target temperature is set to about a 10% higher temperature, e.g., 92° C., thereby preventing the temperature warning signal TW from becoming "H" at a temperature lower than 85° C.

On the other hand, a high-temperature test of a wafer test is performed at the guaranteed temperature upper limit. Accordingly, in the case where the temperature detection circuit has small manufacturing variations and the detection temperature is set to 92° C., in the 85° C. test the temperature warning signal TW is always outputted as "L", which leads to an inaccurate test result. Further, it is not easy in terms of cost to change the system so as to perform the high-temperature test of the wafer test at 92° C. as well as 85° C. Moreover, since a temperature of 92° C. is a value of convenience, it is not appropriate to perform the test at 92° C.

In the temperature detection circuit 50A, the detection temperature is decreased to the guaranteed temperature upper limit in the test mode, thereby checking that the temperature warning signal TW changes from "L" to "H" around at 85° C.

Further, in this state, the variable resistors R1 and R2 of the level shift circuit 5 are changed for tuning, using the simulation circuit 4, so that setting is made such that the temperature warning signal TW changes from "L" to "H" at 85° C.

After tuning, the temperature detection circuit 50A returns to the normal mode. In this case, the MOS transistor TU is turned off, and the MOS transistor TD is turned on, so that the VSHIFT voltage is decreased, and the detection temperature returns to 92° C. In this case, since the temperature detection circuit 50A has been tuned at 85° C., the temperature warning signal TW changes from "L" to "H" at 92° C.

As described above, since the temperature detection circuit 50A includes, in addition to the variable resistors R1 and R2 configuring the level shift circuit 5, the additional resistor RD for decreasing the detection temperature from the target temperature to the guaranteed temperature upper limit, it is possible to check the operation of the temperature detection circuit 50A in the high-temperature test of the wafer test, enabling accurate tuning, which can prevent a cost increase of the wafer test.

Further, even in the case where the detection temperature changes greatly between the test mode and the normal mode, by having the additional resistor RD it is possible to maintain a high tuning accuracy and suppress an increase in the time required for tuning without increasing the size of the tuning circuit.

Further, by using the BGR circuit 1 for temperature detection, it is possible to obtain the temperature detection circuit with a relatively simple structure.

Second Embodiment

Next, the configuration and operation of a temperature detection circuit according to the second embodiment of the invention will be described with reference to FIGS. 13 to 16.

Figure 13:
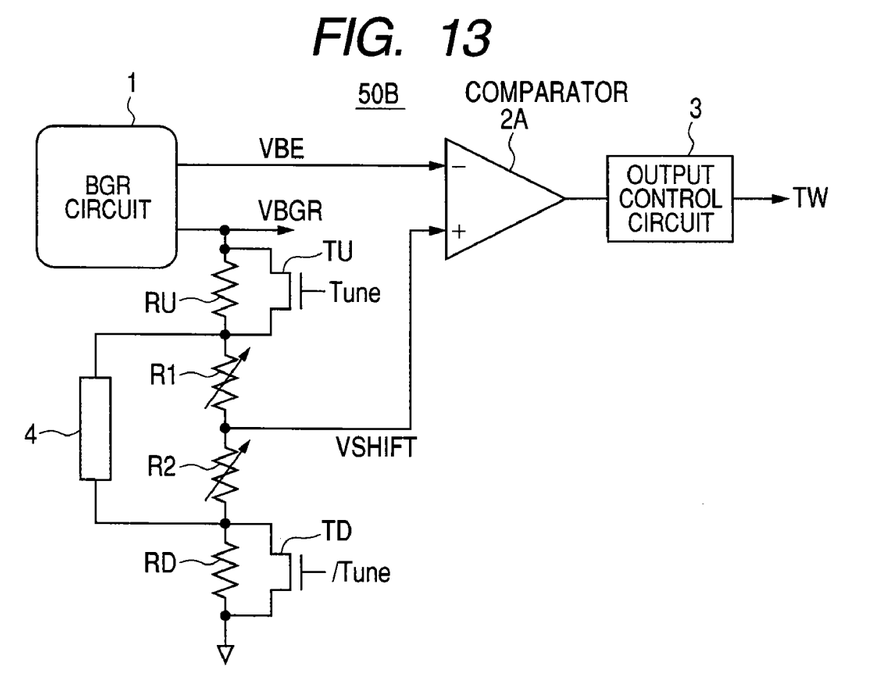
FIG. 13 is a block diagram showing the configuration of a temperature detection circuit according to a second embodiment of the invention.

FIG. 13 is a block diagram showing the configuration of a temperature detection circuit 50B according to the second embodiment. The same configurations as in the temperature detection circuit 50A described with reference to FIG. 8 are denoted by the same reference numerals, and their description will not be repeated.

In the temperature detection circuit 50B shown in FIG. 13, a comparator 2A has a hysteresis characteristic in the normal mode and does not have a hysteresis characteristic in the test mode.

Figure 14:
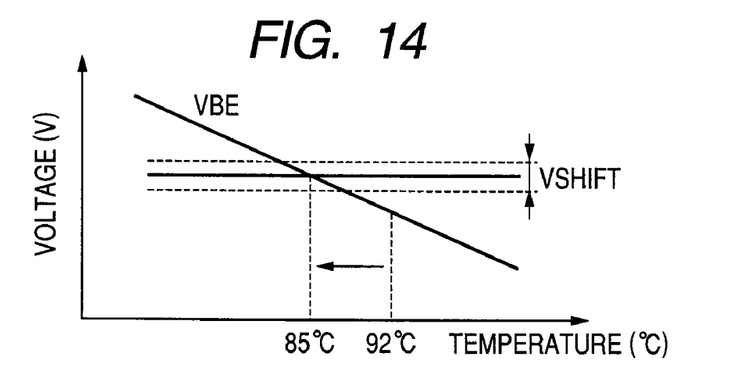
FIG. 14 is a graph showing a change of the detection temperature in the test mode.

FIG. 14 shows that the VSHIFT voltage is increased in the test mode so that the point of intersection of the VSHIFT voltage and the VBE voltage, that is, the detection temperature changes to 85° C. In FIG. 14, the horizontal axis indicates the temperature (° C.), and the vertical axis indicates the voltage (V).

Figure 15:
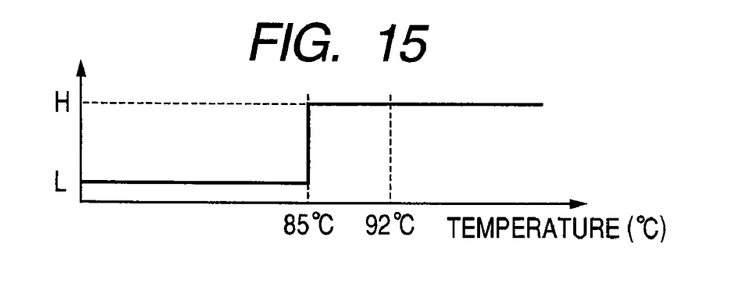
FIG. 15 is a graph schematically showing that a hysteresis characteristic of the comparator is canceled in the test mode.

FIG. 15 schematically shows the characteristic of the comparator 2A in the test mode. In FIG. 15, the horizontal axis indicates the temperature (° C.), and the vertical axis indicates the level "L" and "H" of the temperature warning signal TW. As seen in FIG. 15, the comparator 2A does not have the hysteresis characteristic so that the level of the temperature warning signal TW becomes "H" at a detection temperature of 85° C.

Figure 16:
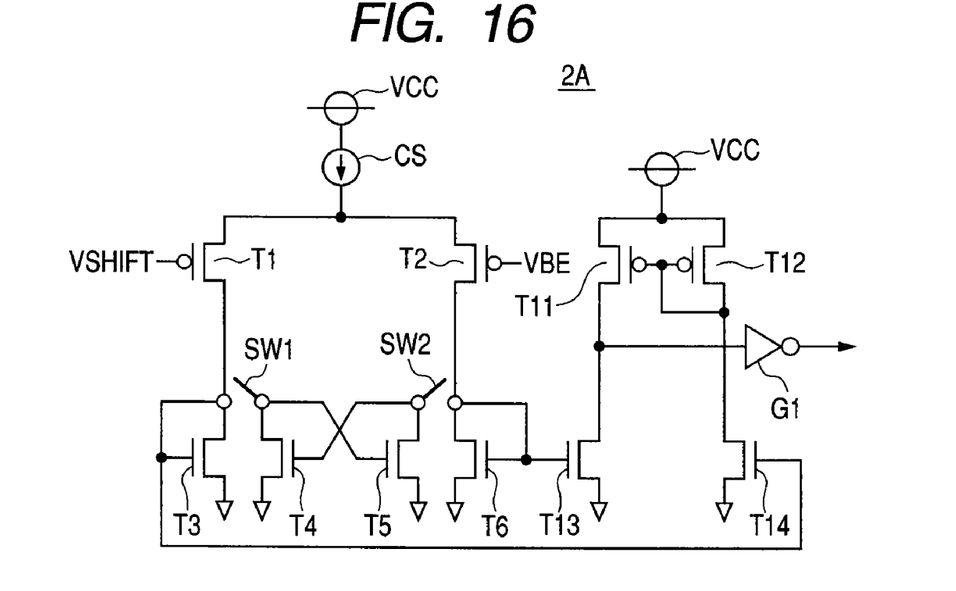
FIG. 16 is a diagram showing the configuration of a comparator whose hysteresis characteristic can be canceled in the test mode.

FIG. 16 shows an example of the configuration of the comparator 2A. The same configurations as in the comparator 2 shown in FIG. 7 are denoted by the same reference numerals, and their description will not be repeated. As shown in FIG. 16, in the comparator 2A, a switch element SW1 is arranged between the drains of the MOS transistors T3 and T4, and a switch element SW2 is arranged between the drains of the MOS transistors T5 and T6.

The switch elements SW1 and SW2 are controlled so that they are turned on in the normal mode and turned off in the test mode. Accordingly, in the test mode, the MOS transistors T4 and T5 (hysteresis circuit) whose gates are coupled to each other's drains do not function (are not turned on), so that the hysteresis characteristic is canceled. The configuration of the comparator 2A shown in FIG. 16 is merely one example. The comparator 2A may have the hysteresis characteristic by using capacitors instead of the MOS transistors T4 and T5, and the switching between hysteresis and non-hysteresis may be performed by turning on and off the capacitors.

In the comparator 2 described with reference to FIG. 12 which has the hysteresis characteristic even in the test mode, it is difficult to determine on which side of the hysteresis characteristic the temperature is detected. To accurately acquire the detection temperature, it is necessary to perform a detection operation by temperature increase and a detection operation by temperature decrease, which disadvantageously requires time to acquire an accurate detection temperature and increases the test cost.

However, as in the second embodiment, by employing the comparator 2A whose hysteresis characteristic can canceled in the test mode, it becomes easier to acquire an accurate detection temperature, which can prevent an increase in test cost.

Further, the comparator 2A may be applied to the temperature detection circuits 50 and 50A shown in FIGS. 2 and 8 respectively. In this case as well, needless to say, it becomes easier to acquire an accurate detection temperature (92° C. in this case) in the test mode.

Third Embodiment

Next, the configuration and operation of a temperature detection circuit according to the third embodiment of the invention will be described with reference to FIGS. 17 to 21.

Figure 17:
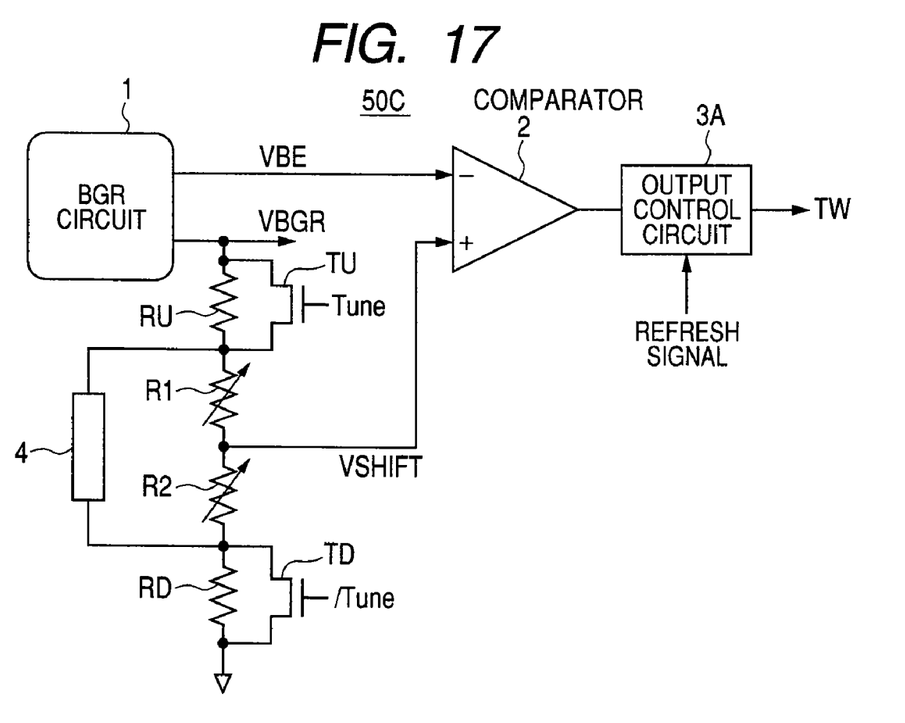
FIG. 17 is a block diagram showing the configuration of a temperature detection circuit according to a third embodiment of the invention.

FIG. 17 is a block diagram showing the configuration of a temperature detection circuit 50C according to the third embodiment. The same configurations as in the temperature detection circuit 50A described with reference to FIG. 8 are denoted by the same reference numerals, and their description will not be repeated.

In the temperature detection circuit 50 shown in FIG. 2 and the temperature detection circuit 50A shown in FIG. 8, the determination result of the chip inside temperature is not outputted in real time in the normal mode, but the output control circuit 3 updates the determination result at predetermined intervals in synchronization with rising edges of an upper counter of the refresh counter 40 in the memory chip 100 (FIG. 1) and outputs it to the outside.

On the other hand, an output control circuit 3A of the temperature detection circuit 50C shown in FIG. 17 outputs, in the test mode, the determination result to the outside at arbitrary timing but not in synchronization with the rising edges of the upper counter of the refresh counter 40.

Figure 18:
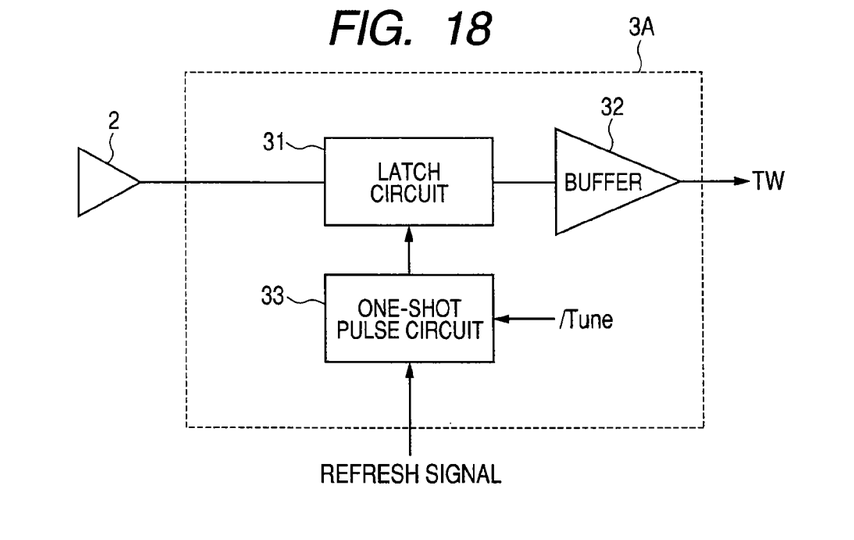
FIG. 18 is a block diagram showing the configuration of an output control circuit.

FIG. 18 is a block diagram showing the configuration of the output control circuit 3A. As shown in FIG. 18, the output control circuit 3A includes a latch circuit 31 which receives a detection signal outputted from the comparator 2; a buffer 32 which receives the output of the latch circuit 31 and outputs the temperature warning signal TW; and a one-shot pulse circuit 33 which, in the normal mode, receives a refresh signal (a count signal of the upper counter) outputted from the refresh counter 40, generates a one-shot pulse having an arbitrary pulse width, and supplies it to the latch circuit 31.

Figure 19:
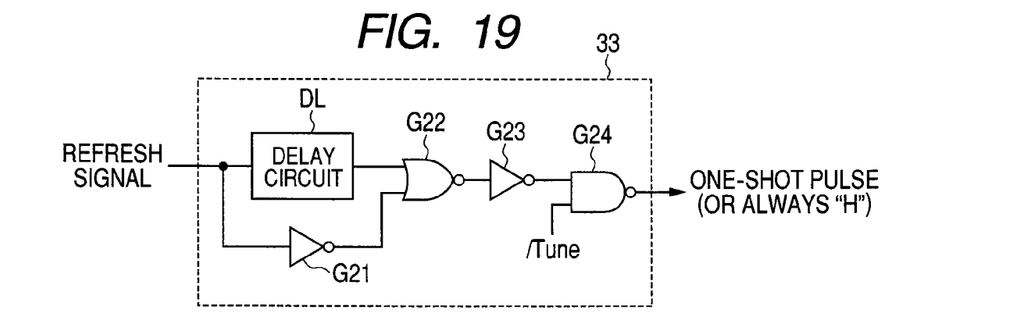
FIG. 19 is a diagram showing the configuration of a one-shot pulse circuit.

FIG. 19 is a diagram showing an example of the configuration of the one-shot pulse circuit 33. As shown in FIG. 19, the one-shot pulse circuit 33 includes a delay circuit DL and an inverter G21 which receive a refresh signal, a NOR circuit G22 which receives the outputs of the delay circuit DL and the inverter G21, an inverter G23 which receives the output of the NOR circuit G22, and a NAND circuit G24 which receives the output of the inverter G23 and an inversion tuning signal/Tune which is "L" during tuning and outputs a one-shot pulse.

Figure 20:
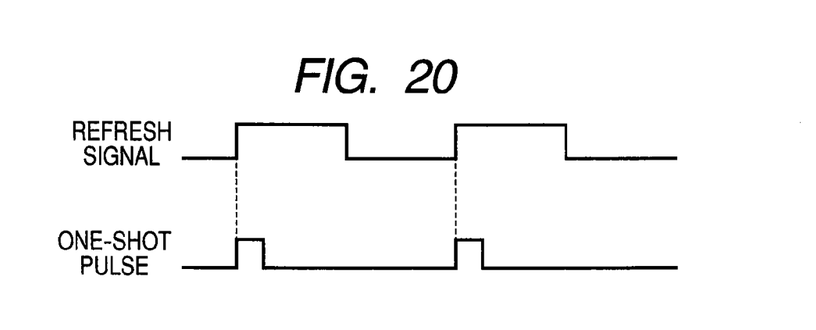
FIG. 20 is a diagram showing the generation timing of a one-shot pulse.

As shown in FIG. 20, the one-shot pulse circuit 33 having such a configuration outputs a one-shot pulse in synchronization with the rising edge of a refresh signal, in response to the refresh signal. The width of the one-shot pulse can be set arbitrarily according to a delay time by the delay circuit DL.

Figure 21:
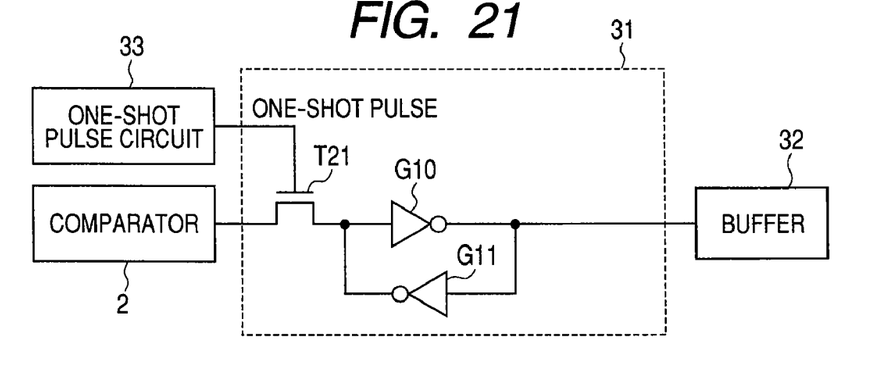
FIG. 21 is a diagram showing the configuration of a latch circuit.

FIG. 21 is a diagram showing an example of the configuration of the latch circuit 31. As shown in FIG. 21, the latch circuit 31 includes an N-channel MOS transistor T21 which is an input gate and is turned on and off by a one-shot pulse outputted from the one-shot pulse circuit 33 and loop-coupled inverters G10 and G11 in the subsequent stage of the MOS transistor T21.

The latch circuit 31 having such a configuration, in the normal mode, takes in a detection signal outputted from the comparator 2 at the rising timing of the one-shot pulse outputted from the one-shot pulse circuit 33 and outputs the detection signal to the buffer 32. Therefore, the output timing of the detection signal can be set arbitrarily in the period during which the one-shot pulse is "H", that is, in the pulse width.

On the other hand, in the test mode, since the inversion tuning signal/Tune is "L", the NAND circuit G24 is in an always-active state "H" in the one-shot pulse circuit 33. In the latch circuit 31, the MOS transistor T21 is in an always-on state, which always outputs a detection signal outputted from the comparator 2 to the buffer 32.

With the adoption of such a configuration, in the test mode, since it is possible to always obtain the determination result independently of the upper counter of the refresh counter at the time of changing the resistance values of the variable resistors R1 and R2 of the level shift circuit 5 to check the determination result, it is possible to reduce the time required for tuning as compared to the case of obtaining the determination result in synchronization with the refresh signal of a relatively long pulse period, which can lead to a reduction in test cost.

Further, the output control circuit 3A may be applied to the temperature detection circuit 50 shown in FIG. 2, and may be applied to the temperature detection circuits 50A and 50B shown in FIGS. 8 and 13. In this case as well, the same effect as described above is obtained.

<Modification>

While the third embodiment described above shows the configuration in which the determination result is always obtained in the test mode, there may be employed a configuration in which the output timing of the determination result can be changed through the use of a count signal of a lower counter as well as the count signal of the upper counter outputted from the refresh counter 40.

Figure 22:
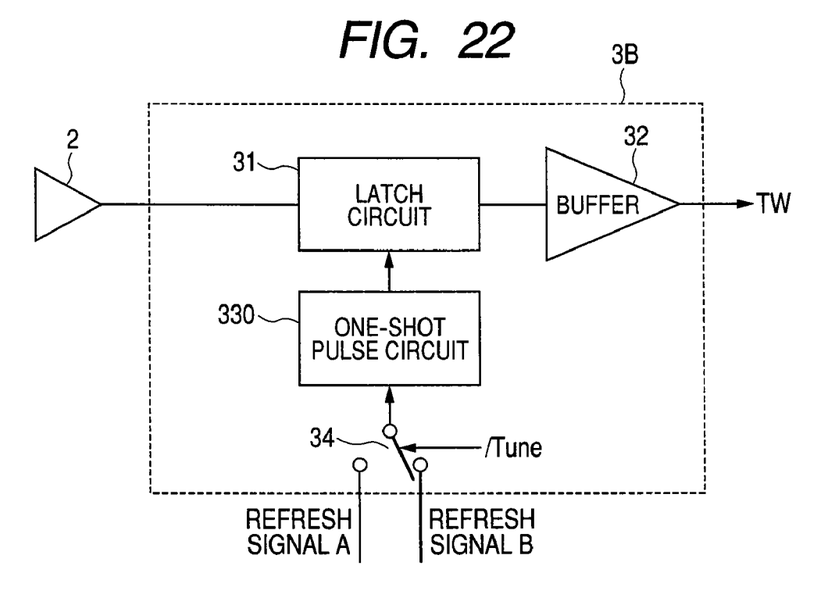
FIG. 22 is a block diagram showing the configuration of an output control circuit according to a modification.

FIG. 22 is a diagram showing the configuration of an output control circuit 3B substituted for the output control circuit 3A shown in FIG. 18.

As shown in FIG. 22, the output control circuit 3B includes a selector switch 34 which supplies a refresh signal A (a count signal of the upper counter) outputted from the refresh counter 40 to a one-shot pulse circuit 330 in the normal mode and supplies a refresh signal B (a count signal of the lower counter) outputted from the refresh counter 40 to the one-shot pulse circuit 330 in the test mode. The switching control of the selector switch 34 is performed by using the inversion tuning signal/Tune which is "L" during tuning.

The one-shot pulse circuit 330 generates, in response to the refresh signal A or B, a one-shot pulse having an arbitrary pulse width at rising timing, and supplies it to the latch circuit 31. Since the pulse period (second period) of the refresh signal B is shorter than the pulse period (first period) of the refresh signal A, it is possible to reduce the time required for tuning, which can lead to a reduction in test cost.

Figure 23:
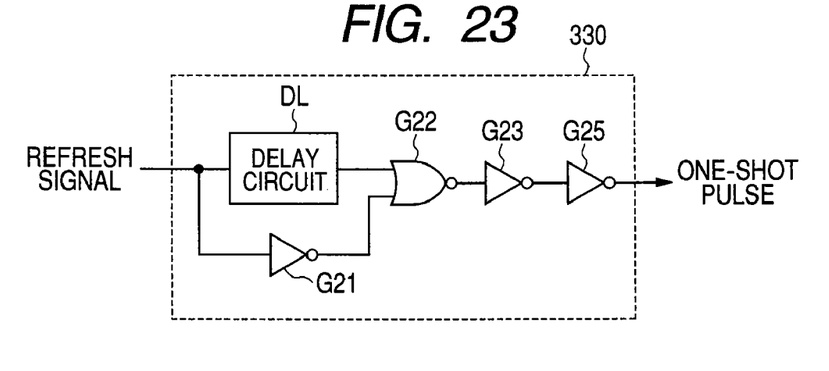
FIG. 23 is a diagram showing the configuration of a one-shot pulse circuit according to the modification.

As shown in FIG. 23, the configuration of the one-shot pulse circuit 330 is basically similar to that of the one-shot pulse circuit 33 shown in FIG. 19, but differs in that the output of the inverter G23 is supplied to an inverter G25 to be inverted for output.

What is claimed is:

1. A semiconductor device comprising:
a temperature detection circuit which detects whether a semiconductor chip reaches a predetermined determination temperature,
wherein the temperature detection circuit includes:
an output circuit of a first signal having a temperature characteristic;
an output circuit of a second signal having a different temperature characteristic from that of the first signal;
a tuning circuit which outputs a third signal by shifting a voltage of the second signal by a first predetermined value; and
a comparator which compares the first signal with the third signal,
wherein the tuning circuit includes:
a raising circuit which raises a voltage of the third signal by a second predetermined value during a test for a temperature detection operation of the temperature detection circuit.

2. The semiconductor device according to claim 1,
wherein the tuning circuit includes a level shift circuit,
wherein the raising circuit includes:
a first resistor and a first transistor coupled in parallel with the first resistor which are coupled between the output circuit of the second signal and the level shift circuit; and
a second resistor and a second transistor coupled in parallel with the second resistor which are coupled between the level shift circuit and a reference voltage, and
wherein the first transistor and the second transistor are complementarily turned on.

3. The semiconductor device according to claim 1,
wherein the comparator includes a hysteresis circuit, and
wherein the hysteresis circuit is turned on during a normal operation of the temperature detection circuit, and the hysteresis circuit is turned off during the test.

4. The semiconductor device according to claim 1, further comprising an output control circuit which receives an output of the comparator and outputs an external output signal,
wherein the output control circuit outputs the output of the comparator as the external output signal, with a predetermined period, during a normal operation of the temperature detection circuit, and always outputs the output of the comparator as the external output signal during the test.

5. The semiconductor device according to claim 1, further comprising an output control circuit which receives an output of the comparator and outputs an external output signal,
wherein the output control circuit outputs the external output signal with a first period during a normal operation of the temperature detection circuit, and outputs the external output signal with a second period shorter than the first period during the test.

6. A semiconductor device comprising:
a temperature detection circuit which detects whether a semiconductor chip reaches a predetermined determination temperature,
wherein the temperature detection circuit includes:
an output circuit of a first signal having a temperature characteristic;
an output circuit of a second signal having a different temperature characteristic from that of the first signal;
a tuning circuit which outputs a third signal by shifting a voltage of the second signal by a first predetermined value; and
a comparator which compares the first signal with the third signal,
wherein the tuning circuit includes:
a level shift circuit;
a first resistor and a first transistor coupled in parallel with the first resistor which are coupled between the output circuit of the second signal and the level shift circuit; and
a second resistor and a second transistor coupled in parallel with the second resistor which are coupled between the level shift circuit and a reference voltage, and
wherein the first transistor and the second transistor are complementarily turned on in response to an operation mode signal.

7. The semiconductor device according to claim 1, wherein the level shift circuit includes a dividing resistor which divides the voltage of the second signal.

8. The semiconductor device according to claim 7, wherein a resistance value of the second resistor is set to a value that suppresses a change in the amount of current flowing into the level shift circuit when the first transistor is turned on from off.

9. The semiconductor device according to claim 8, wherein a resistance value of the first resistor is substantially equal to a resistance value of the second resistor.

* * * * *